US012584523B2

(12) United States Patent
Van Zoelen et al.

(10) Patent No.: US 12,584,523 B2
(45) Date of Patent: Mar. 24, 2026

(54) ROLLING BEARING

(71) Applicant: Aktiebolaget SKF, Gothenburg (SE)

(72) Inventors: Marco Theodorus Van Zoelen, Houten (NL); Pieter Louis Van Dalen, Oosterhout (NL)

(73) Assignee: Aktiebolaget SKF, Gothenburg (SE)

( * ) Notice: Subject to any disclaimer, the term of this patent is extended or adjusted under 35 U.S.C. 154(b) by 45 days.

(21) Appl. No.: 18/637,537

(22) Filed: Apr. 17, 2024

(65) Prior Publication Data

US 2024/0360874 A1      Oct. 31, 2024

(30) Foreign Application Priority Data

Apr. 26, 2023     (DE) .......................... 102023203880.3

(51) Int. Cl.
*F16C 19/16*           (2006.01)
*C10M 101/00*        (2006.01)
(Continued)

(52) U.S. Cl.
CPC ....... *F16C 33/6688* (2013.01); *C10M 101/00* (2013.01); *C10M 133/20* (2013.01);
(Continued)

(58) Field of Classification Search
CPC .... F16C 19/163; F16C 19/166; F16C 33/585; F16C 33/6603; F16C 33/6607;
(Continued)

(56) References Cited

U.S. PATENT DOCUMENTS 6,238,744 B1      5/2001   Magoulick et al.

FOREIGN PATENT DOCUMENTS

CN          104948576 A   *   9/2015   .............. F16C 33/64
JP          2003021148 A   *   1/2003   ............ F16C 33/585
(Continued)

OTHER PUBLICATIONS

Berger, T. "Cold Run Noise: Hoot-Noise Low-Temperature Characteristics of Special Lubricants and Noise Development in Roller Bearings," (Abstract Only), accessed on the internet at https://www.researchgate.net/publication/294231101_Cold_run_noise_Hoot-noise_low-temperature_characteristics_of_special_lubricants_and_noise_development_in_roller_bearings, Jan. 2006, retrieved Mar. 20, 2024, 5pgs.

(Continued)

*Primary Examiner* — Phillip A Johnson
(74) *Attorney, Agent, or Firm* — Stinson LLP

(57)                  ABSTRACT

A rolling bearing (1) includes an outer ring (2), an inner ring (4), and a plurality of rolling elements (6) arranged between the outer and inner ring (2, 4). The rolling bearing (1) is provided with lubricant. The outer ring (2) has an outer contact width ($b_o$) between the outer ring (2) and the rolling elements (6). The inner ring (4) has an inner contact width ($b_i$) between the inner ring (4) and the rolling elements (6). A ratio $\varphi = b_i/b_o$ between the inner and outer contact width ($b_i$, $b_o$) is larger than 1.65 or a ratio $\varphi = b_i/b_o$ between the inner and outer contact width ($b_i$, $b_o$) is larger than 0.97 and smaller than 1.06 or a ratio $\varphi = b_i/b_o$ between the inner and outer contact width ($b_i$, $b_o$) is smaller than 0.68.

17 Claims, 1 Drawing Sheet

(51) Int. Cl.

| | |
|---|---|
| *C10M 133/20* | (2006.01) |
| *C10M 139/00* | (2006.01) |
| *F16C 33/58* | (2006.01) |
| *F16C 33/66* | (2006.01) |
| *C10N 40/02* | (2006.01) |

(52) U.S. Cl.
CPC ......... *C10M 139/00* (2013.01); *F16C 19/163* (2013.01); *F16C 33/585* (2013.01); *C10M 2215/102* (2013.01); *C10M 2227/09* (2013.01); *C10M 2290/04* (2013.01); *C10N 2040/02* (2013.01); *F16C 2210/04* (2013.01)

(58) Field of Classification Search
CPC .............. F16C 33/6633; F16C 33/6637; F16C 33/664; F16C 33/6688; F16C 2210/04; F16C 2240/76; C10M 2215/102; C10M 2227/09; C10M 2290/04; C10N 2040/02
See application file for complete search history.

(56) References Cited

FOREIGN PATENT DOCUMENTS

| | | | | | | |
|---|---|---|---|---|---|---|
| JP | 2003021149 | A | * | 1/2003 | .......... | F16C 33/6633 |
| JP | 2009047233 | A | * | 3/2009 | ............ | F16C 33/585 |
| JP | 2013185701 | A | * | 3/2015 | .............. | F16C 19/06 |
| JP | 2016191474 | A | * | 11/2016 | ........... | F16C 33/585 |
| SU | 681248 | A | * | 8/1979 | | |
| WO | WO-2011062269 | A1 | * | 5/2011 | .............. | F16C 19/56 |

OTHER PUBLICATIONS

NTN Corporation, "Development of High Speed Rotation Ball Bearing for Pulley," accessed on the internet at https://www.ntnglobal.com/en/news/new_products/news201700046.html, Jun. 2017, retrieved Mar. 20, 2024, 2pgs.

* cited by examiner

ROLLING BEARING

CROSS-REFERENCE TO RELATED APPLICATION

This application claims priority to German Application No. 102023203880.3, filed Apr. 26, 2023, the entirety of which is hereby incorporated by reference.

FIELD

The present invention relates to rolling bearings.

SUMMARY

Hooting noise is a loud tonal noise, that typically occurs in applications with small and medium size ball bearings such as electric motors, starter alternators, belt tensioner units (BTU) and drive shaft support bearings. Characteristically, it is associated with start-up conditions, low temperatures, and specific rotational speeds. However, the appearance of hooting noise can depend on a plurality of factors such as the operating conditions, the system dynamics, the bearing design and/or the lubrication.

Several approaches have been taken in order to reduce or even eliminate hooting noise. One way to reduce hooting noise is to use a bearing with a non-uniform ball spacing. Another possibility is to use special lubricants and/or additives to the lubricant that may prevent hooting noise at cold temperatures and/or during start-up conditions. However, these approaches to reduce or even eliminate hooting noise are either cost intensive or work only at certain condition and can negatively impact other performance parameters such as bearing life.

It is therefore object of the present invention to provide a rolling bearing in which hooting noise is reduced in a simple and cost-efficient manner independent of the conditions in which the rolling bearing is used.

SUMMARY

This object is solved by rolling bearing according to claim 1.

In the following a rolling bearing is provided which comprises an outer ring, an inner ring, and a plurality of rolling elements arranged between the outer and inner ring. In particular, the rolling bearing may be a ball bearing. For example, the rolling bearing may be a deep groove ball bearing or an angular contact ball bearing. The inner ring and the outer ring can rotate relative to each other. For example, the inner ring may be a rotating ring, while the outer ring is a stationary ring. Alternatively, the outer ring may be the rotating ring, while the inner ring is stationary.

Moreover, the rolling bearing is provided with a lubricant. One of the purposes of a lubricant is to reduce friction between surfaces in mutual contact, such as a contact between the rolling elements and a raceway provided on the inner and outer bearing ring. The contacts of the rolling elements with the inner ring and the outer ring are called inner and outer ring contacts, respectively. The width of the outer contact is $b_o$, and the width of the inner ring contact is $b_i$. The contact width is related to the groove radius r of the respective bearing ring and the ball diameter D and depends further on other bearing parameters, such as the pitch diameter, the clearance and/or the load. The relations and dependencies of the contact width are described, for example the book "Harris, T. A., Rolling Bearing Analysis".

Usually, the contact width may be calculated and/or determined with the aid of simulation software.

A ratio between the contact width of the inner ring $b_i$ and the contact width of the outer ring $b_o$ is defined as follows: $\varphi=b_i/b_o$. This ratio $\varphi$ can be designed by means of choosing the groove radii of the inner ring $r_i$ and the outer ring $r_o$, respectively, relative to the ball diameter D. For the rotational speeds at which hooting noise occur, the centrifugal load of the rolling elements is small compared to the static load. In that case the ratio $\varphi$ hardly depends on the load and is thus in fact a bearing design parameter.

The inventors have surprisingly found that hooting noise can be reduced or even eliminated independent of the conditions in which the rolling bearing is used by setting the ratio $\varphi=b_i/b_o$ between the inner and outer contact width, such that the ratio $\varphi$ is larger than 1.65 or such that the ratio $\varphi=b_i/b_o$ between the inner and outer contact width is larger than 0.97 and smaller than 1.06 or such that the ratio $\varphi=b_i/b_o$ between the inner and outer contact width is smaller than 0.68. More particularly, this allows to reduce or even eliminate hooting in a simple and cost-efficient manner since no special attention has to be given to other contributing factors such as lubricant and/or machine design, and the like. Using a different lubricant as a solution may have a negative impact on other performance parameters, such as bearing life. These negative side effects may be prevented by using the invention instead.

In addition, the ratio $\varphi=b_i/b_o$ between the inner and outer contact width may be smaller than 1.8. In particular, the ratio $\varphi=b_i/b_o$ may be larger than 1.65 ($\varphi>1.65$) and smaller than 1.8 ($\varphi<1.8$). This has the further advantage that the frictional torque of the bearing may be reduced and/or a wear on the bearing rings and/or rolling elements may be reduced.

According to a further embodiment, a viscosity value of the lubricant is larger than 10 $mm^2/s$ at 40° C. Preferably, the viscosity value of the lubricant may be larger than 15 $mm^2/s$ at 40° C. For example, the lubricant may be an oil-based lubricant. The oil may be mineral oil, ester oil, diester oil, olefin oil and/or a combination thereof. Furthermore, the lubricant may include an additive, particularly a thickening additive. For example, the additive may be lithium soap, a barium salt, urea and/or a combination thereof. Preferably, the lubricant has a working temperature range between −40° C. and 150° C.

Further preferred embodiments are defined in the dependent claims as well as in the description and the figures. Thereby, elements described or shown in combination with other elements may be present alone or in combination with other elements without departing from the scope of protection.

BRIEF DESCRIPTION OF THE DRAWINGS

In the following, preferred embodiments of the invention are described in relation to the drawings, wherein the drawings are exemplarily only, and are not intended to limit the scope of protection. The scope of protection is defined by the accompanied claims, only.

The figures show.

In the following same or similar functioning elements are indicated with the same reference numerals.

DETAILED DESCRIPTION

Figure 1:
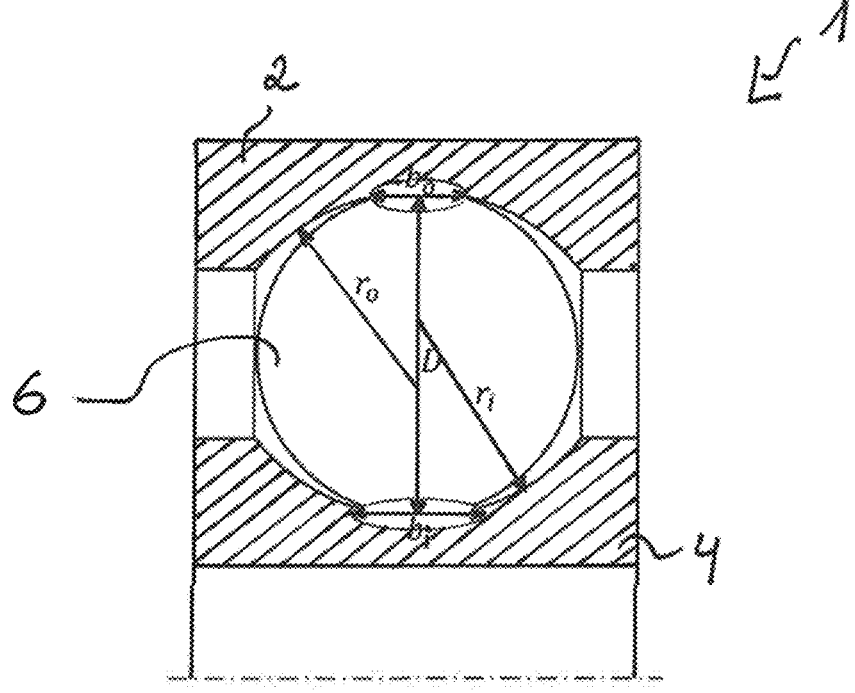
FIG. 1: a schematic cross section of a rolling bearing according to an embodiment of the invention.

FIG. 1 shows a cross section of a rolling bearing 1. The rolling bearing 1 is a ball bearing, such as deep groove ball bearing or an angular contact ball bearing. The rolling bearing 1 has an outer ring 2, an inner ring 4, and a plurality of rolling elements 6, in this case balls, arranged between the outer and inner ring 2, 4. The inner ring 4 and the outer ring 2 are rotatable relative to each other. For example, the inner ring 4 may be the rotating ring, while the outer ring 2 is fixed or the outer ring 2 may be the rotating ring, while the inner ring 4 is fixed.

To reduce wear and facilitate a rotation of the rolling bearing 1, the rolling bearing 1 is provided with a lubricant. Preferably, a viscosity value of the lubricant may be larger than 10 mm$^2$/s at 40° C. The lubricant may be an oil-based lubricant, wherein the oil may be a mineral oil, an ester oil, a diester oil, an olefin oil and/or a combination thereof. Furthermore, the lubricant may include an additive, particularly a thickening additive. For example, the additive may be lithium soap, a barium salt, urea and/or a combination thereof. Preferably, the lubricant has a working temperature range between –40° C. and 150° C.

One of the purposes of the lubricant is to reduce friction between surfaces in mutual contact, such as a contact between the rolling elements and a raceway provided on the inner and outer bearing ring 2, 4. As mentioned above, the contact width is related to the groove radius r of the respective bearing ring, the ball diameter D, and depends further on other bearing parameters, such as the pitch diameter, the clearance and/or the load. The ratio between the contact width of the inner ring $b_i$ and the contact width of the outer ring $b_o$, namely $\varphi = b_i/b_o$, can be designed by means of choosing the groove radii of the inner ring $r_i$ and the outer ring $r_o$, respectively, relative to the ball diameter D. For the rotational speeds when hooting noise occurs, the centrifugal load of the rolling elements is small compared to the static load. In that case the ratio $\varphi$ hardly depends on the load and is thus in fact a bearing design parameter.

Figure 2:
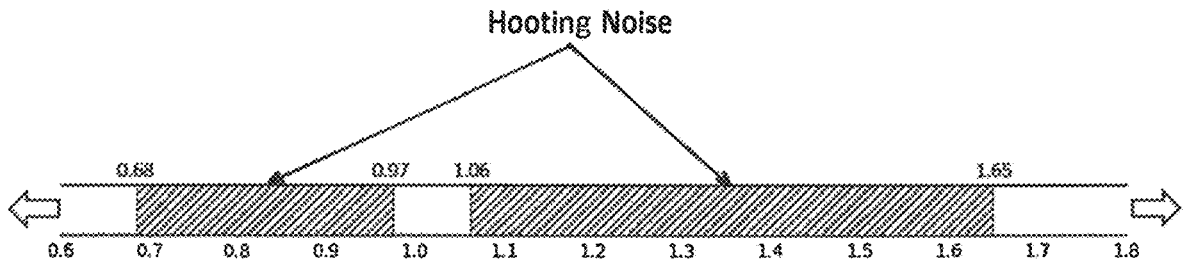
FIG. 2: an overview at which ratios (p between an inner contact width and an outer contact width hooting noise is expected to occur.

As can be seen from FIG. 2, there are ratios $\varphi = b_i/b_o$ between the inner and outer contact width $b_i$, $b_o$ at which no hooting noise occurs and ratios at which hooting noise does occur. The inventors have surprisingly found that hooting noise can be reduced or even eliminated independent of the conditions in which the rolling bearing 1 is used by setting the ratio $\varphi = b_i/b_o$ between the inner and outer contact width $b_i/b_o$ such that the ratio is larger than 1.65 or such that the ratio $b_i/b_o$ is larger than 0.97 and smaller than 1.06 or such that the ratio $b_i/b_o$ is smaller than 0.68. Preferably, the ratio $b_i/b_o$ may be smaller than 1.8. This has the further advantage that the frictional torque of the bearing is reduced and/or a wear on the bearing rings and/or rolling elements may be reduced.

In summary, by adjusting the groove radii of the inner and outer ring of the bearing such that a certain ratio between the inner and outer contact width $\varphi = b_i/b_o$ is fulfilled allows to reduce or even eliminate hooting noise in a simple and cost-efficient manner since no special attention has to be given to other contributing factors such as the lubricant and/or the machine design, and the like. Using a different lubricant as a solution may have a negative impact on other performance parameters, such as bearing life. These negative side effects can be prevented by using the invention instead.

REFERENCE NUMERALS

1 rolling bearing
2 outer ring
4 inner ring
6 rolling element
$r_o$ groove radius of the outer ring
$r_i$ groove radius of the inner ring
D ball diameter
$b_o$ outer contact width
$b_i$ inner contact width

What is claimed is:

1. A rolling bearing comprising:
an outer ring;
an inner ring;
lubricant; and
a plurality of rolling elements arranged between the outer and inner rings;
wherein the outer ring has an outer contact width between the outer ring and the rolling elements, and the inner ring has an inner contact width between the inner ring and the rolling elements, a ratio between the inner and outer contact widths being larger than 1.65, or larger than 0.97 and smaller than 1.06, or smaller than 0.68.

2. The rolling bearing according to claim 1, wherein a viscosity value of the lubricant is larger than 10 mm$^2$/s at 40° C.

3. The rolling element according to claim 2, wherein the ratio between the inner and outer contact width is smaller than 1.8.

4. The rolling bearing according to claim 3, wherein the lubricant is an oil-based lubricant.

5. The rolling bearing according to claim 4, wherein the oil-based lubricant includes mineral oil, ester oil, diester oil, olefin oil and/or a combination thereof.

6. The rolling bearing according to claim 5, wherein the oil-based lubricant includes an additive.

7. The rolling bearing according to claim 6, wherein the additive includes lithium soap, a barium salt, urea and/or a combination thereof.

8. The rolling bearing according to claim 7, wherein the rolling bearing is a ball bearing.

9. The rolling bearing according to claim 8, wherein the ball bearing is a deep groove ball bearing or an angular contact ball bearing.

10. The rolling element according to claim 1, wherein the ratio between the inner and outer contact width is smaller than 1.8.

11. The rolling bearing according to claim 1, wherein the lubricant is an oil-based lubricant.

12. The rolling bearing according to claim 11, wherein the oil-based lubricant includes mineral oil, ester oil, diester oil, olefin oil and/or a combination thereof.

13. The rolling bearing according to claim 1, wherein the lubricant includes an additive.

14. The rolling bearing according to claim 13, wherein the additive includes lithium soap, a barium salt, urea and/or a combination thereof.

15. The rolling bearing according to claim 1, wherein the rolling bearing is a ball bearing.

16. The rolling bearing according to claim 15, wherein the ball bearing is a deep groove ball bearing or an angular contact ball bearing.

17. The rolling bearing according to claim 1, wherein a viscosity value of the lubricant is larger than 15 mm$^2$/s at 40° C.

\* \* \* \* \*